(12) United States Patent
Xie et al.

(10) Patent No.: US 10,110,616 B1
(45) Date of Patent: Oct. 23, 2018

(54) USING GROUP ANALYSIS TO DETERMINE SUSPICIOUS ACCOUNTS OR ACTIVITIES

(71) Applicant: DataVisor Inc., Santa Clara, CA (US)

(72) Inventors: Yinglian Xie, Cupertino, CA (US); Fang Yu, Sunnyvale, CA (US)

(73) Assignee: DataVisor Inc., Mountain View, CA (US)

( * ) Notice: Subject to any disclaimer, the term of this patent is extended or adjusted under 35 U.S.C. 154(b) by 0 days.

(21) Appl. No.: 14/620,029

(22) Filed: Feb. 11, 2015

Related U.S. Application Data

(60) Provisional application No. 61/938,611, filed on Feb. 11, 2014.

(51) Int. Cl.
*G06F 21/00* (2013.01)
*H04L 9/00* (2006.01)
*H04L 29/06* (2006.01)
*H04L 29/08* (2006.01)

(52) U.S. Cl.
CPC .............. *H04L 63/14* (2013.01); *H04L 67/30* (2013.01)

(58) Field of Classification Search
CPC ........................................................ H04L 63/14
USPC ..................................................... 726/22–25
See application file for complete search history.

(56) References Cited

U.S. PATENT DOCUMENTS

| | | | | |
|---|---|---|---|---|
| 2007/0240217 A1* | 10/2007 | Tuvell | ................... | G06F 21/56 726/24 |
| 2010/0115621 A1* | 5/2010 | Staniford | ............ | H04L 63/1416 726/25 |
| 2012/0090028 A1* | 4/2012 | Lapsley | .................. | H04L 63/08 726/22 |
| 2013/0347113 A1* | 12/2013 | Yu | .......................... | G06F 21/577 726/24 |
| 2014/0259156 A1* | 9/2014 | Beutel | ................. | H04L 63/1416 726/22 |

OTHER PUBLICATIONS

*Jaccard Index.* Wikipedia, the free Encyclopedia. Last modified Nov. 22, 2014. Retrieved on Feb. 11, 2015. Retrieved from the Internet: URL<http://en.wikipedia.org/wiki/Jaccard_index>. 6 pages.
*Kullback—Leibler Divergence.* Wikipedia, the free Encyclopedia. Last modified Jan. 16, 2015. Retrieved on Feb. 11, 2015. Retrieved from the Internet: URL<http://en.wikipedia.org/wiki/Kullback%E2%80%93Leibler_divergence>. 11 pages.

* cited by examiner

*Primary Examiner* — Alexander Lagor
(74) *Attorney, Agent, or Firm* — Fish & Richardson P.C.

(57) ABSTRACT

Methods, systems, and apparatus, including computer programs encoded on computer storage media, for detecting suspicious users. One of the methods includes obtaining a collection of event logs or event feeds associated with a plurality of users to generate a collection of user properties; using the user properties to generate a plurality of groups of events; determining whether one or more groups are suspicious groups; and in response to a determination that one or more groups are suspicious, determining whether there are malicious accounts or events associated with each suspicious group.

23 Claims, 3 Drawing Sheets

USING GROUP ANALYSIS TO DETERMINE SUSPICIOUS ACCOUNTS OR ACTIVITIES

CROSS-REFERENCE TO RELATED APPLICATIONS

This application claims the benefit under 35 U.S.C. § 119(e) of the filing date of U.S. Patent Application 61/938,611, which was filed on Feb. 11, 2014, and which is incorporated here by reference.

BACKGROUND

This specification relates to detecting suspicious users.

The flourish of online services has attracted numerous attackers to conduct a wide range of nefarious activities, ranging from spam posts, phishing emails, fake invitations, cheated games, artificially promoted ads, to fraudulent financial transactions. Recent observations have identified an increased number of attacks of different forms, affecting online services of all sizes, for example, ranging from millions of compromised accounts to hundreds of millions fake accounts being crated on various social networking sites and numerous small online forums.

Although each attack may look different in scale and method, a common thread typically found among them is the requirement of a large number of malicious user accounts. These accounts can either be newly created or can be obtained by compromising real user accounts. Guarding the legitimate accounts and detecting malicious accounts is thus ultimately critical to ensure the success of all online services.

SUMMARY

A group-analysis method groups a set of accounts or events together for analysis to determine their similarity and the degree of suspiciousness. The groups can be used to determine whether the involved set of accounts or events are likely from the same types of attacks or likely controlled by the same set of attackers. Groups may also be used to detect a large batch of malicious accounts or events, once one or a few malicious accounts (or events) in the group are detected using some means (e.g., reported by customers or notified by a third party).

The group-analysis techniques are based on both a similarity analysis among group members and a comparison with a global profile of accounts and events. The input to the system includes Web logs or event logs that are readily available from all services. Example inputs include sign-in and sign-up logs. Other example inputs include e-commerce transaction logs, online purchase logs, comment or review post logs (e.g., commonly available for social sites), user's Web page navigation and action log, and asset-access logs.

The system can be implemented on commonly available computer systems without the need of special hardware. The system can be deployed in a cloud-computing environment, where it receives events or event logs from other service providers or from end users directly. Alternatively, the system can be deployed on premise for service provider, working directly on service's logs or receiving events in real-time.

Through big-data analysis, the system automatically generates groups of suspicious accounts and suspicious account activities, e.g., spam, phishing, fraudulent transactions or payments. In addition, the system may also generate a set of risk models or classifiers to detect future events or user accounts either in real time or through periodic offline batch analysis.

In general, one innovative aspect of the subject matter described in this specification can be embodied in methods that include the actions of obtaining a collection of event logs or event feeds associated with a plurality of users to generate a collection of user properties; using the user properties to generate a plurality of groups of events; determining whether one or more groups are suspicious groups; and in response to a determination that one or more groups are suspicious, determining whether there are malicious accounts or events associated with each suspicious group. Other embodiments of this aspect include corresponding computer systems, apparatus, and computer programs recorded on one or more computer storage devices, each configured to perform the actions of the methods. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

The foregoing and other embodiments can each optionally include one or more of the following features, alone or in combination. In particular, one embodiment includes all the following features in combination. Generating the plurality of groups of events includes grouping events based on event attributes or combinations of event attributes. The method includes generating a group profile for each group, wherein each group is associated with a set of user accounts. Features for each event or account associated with the user accounts of the group are used to generate the group profile for a group. The method includes comprising generating a global profile across the available user population or event set. Determining whether a group is a suspicious group includes comparing the group profile with the global profile. For each group determined to be suspicious, all user accounts or events in the detected group are output as malicious. For each group determined to be suspicious, it is determined whether each user account in the group matches a group profile according to an analysis of each feature. If it is determined that a user account in the group matches the group profile, then the user account is output as malicious. Determining whether a group is suspicious includes determining whether each feature of the group is suspicious and whether or not each suspicious feature is a strong feature or a weak feature.

The subject matter described in this specification can be implemented in particular embodiments so as to realize one or more of the following advantages. Grouping different events or accounts together for detection helps provide for detecting stealthy malicious events and accounts that may look normal when they are examined in isolation. In addition, in some cases, it is easier to detect one or two individual malicious activities or accounts, but it is difficult to detect a large number of malicious activities or accounts that may share similar patterns. Having a global view of events and accounts allows the system to detect a large batch of malicious activities, as long as at least one of them is captured by some means. The details of one or more embodiments of the subject matter of this specification are set forth in the accompanying drawings and the description below. Other features, aspects, and advantages of the subject matter will become apparent from the description, the drawings, and the claims.

DETAILED DESCRIPTION

Figure 1:
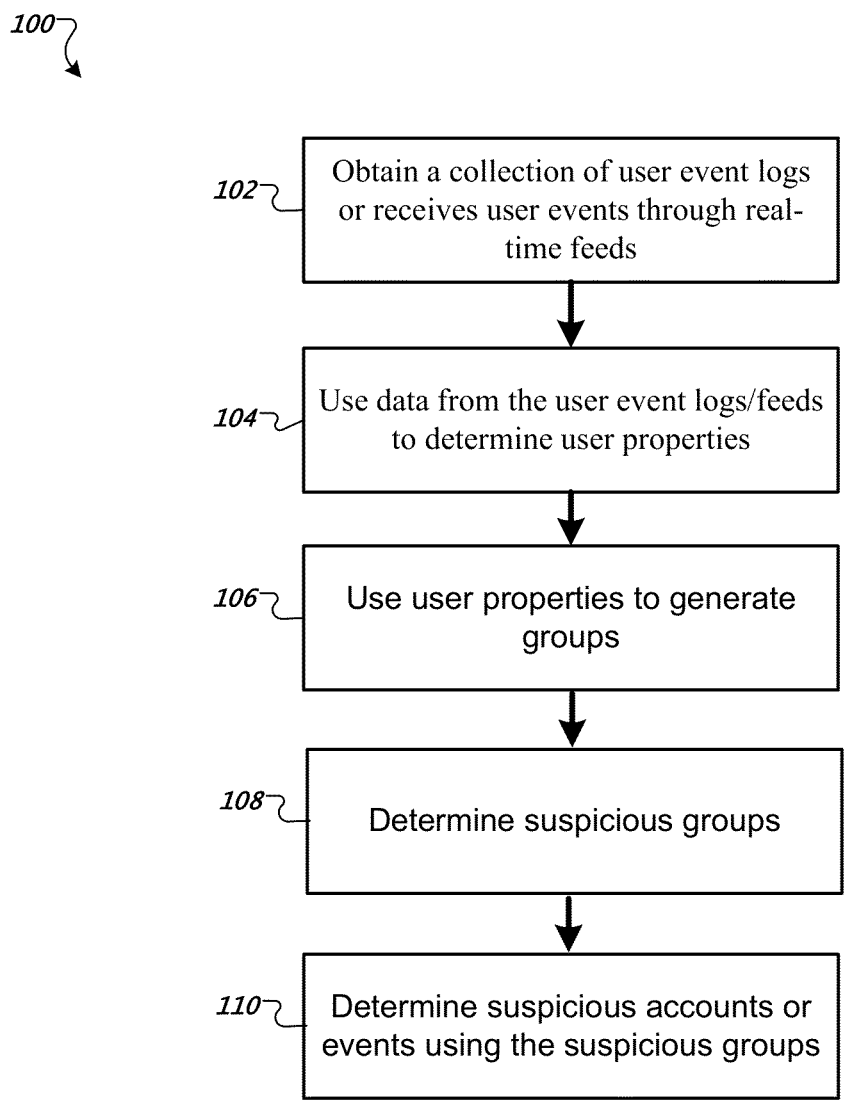
FIG. 1 illustrates an example one-time user-stat process.

The present specification describes techniques for using user activity logs to collect user statistics that can be used to generate one or more groups. The groups can then be analyzed to determine whether any of the groups are suspicious. Suspicious groups can be further analyzed to detect malicious accounts or events.

Conventional defense systems focus on the last stage of the attacks for detection, i.e., when the malicious accounts are actually used to abuse service and perform attacks, for example, posting ads, spamming, abusing computation resources on cloud-computing environments, or performing fraudulent transactions. As attack formats and methods frequently evolve, it is often difficult to detect new attacks.

Therefore, most of the conventional detection systems are reactive. They typically are effective only after the attack has happened; in particular after the new attack patterns have been observed and learned by manual efforts. For example, by examining new fraudulent transactions or spam campaigns, human experts can derive new rules or generate new content signatures. These solutions have drawbacks, for example: 1) The solutions are often effective after attackers have conducted malicious activities. So damage may have already occurred. Even if the systems effectively detected these accounts and blocked them, it may not impact the attack eco-system because attackers can always sign up free new accounts again with a low cost. 2) The detection results are often incomplete. Such solutions can detect only actively attacking accounts, while missing a large number of malicious accounts that are still in various incubation stages.

In addition, most attack detection systems work in isolation. 1) They usually examine each event individually, losing the power of a global view to detect large-scale, coordinated attacks. 2) They often rely on experts to manually create rules or other attack signatures. As attacks get increasing stealthy, it is difficult for human experts to manually discover new sophisticated attack patterns that involve many different types of events and steps. 3) They often rely on many application specific signals, such as post contents or financial transaction details. These signals are specially crafted for each service and site. They are hard to transfer to other systems.

In contrast with the conventional attack detection systems, the systems and techniques described in the present specification specifically focus on account security. The aim is to secure every "good" user's account and detect all attacker-created malicious accounts.

Architecture

A big data analytics engine can be constructed to provide account security as a service. In some implementations, the big data analytics engine operates on a cloud. In some other implementations it operates on a server system, e.g., for a particular company. The input to the system includes Web logs that are readily available from many services (e.g., account sign-in and sign-up logs). Consequently, the architecture does not require individual customers to purchase additional hardware. Through data analysis, the big data analytics engine can automatically detect fake accounts, compromised accounts, and various malicious account activities, e.g., spam, phishing, fraudulent transactions or payments. The system sends back detection results both in real-time and through periodic updates.

Through detecting malicious/compromised accounts, the system can pro-actively help fighting different forms of malicious activities, e.g., spam, phishing, cloud-computing abuse, fraudulent transactions or payments.

Inputs

In the analysis engine of the system, the process to compute user properties is called a group analysis process. The group analysis process takes user event logs as inputs. Example logs include one or more of a user login log, a signup log, or a transaction logs. Fields for each event include:

1. Event type: e.g., sign-up, login, post-comment, payment
2. Event success: 0 or success 1 for failure
3. User name or user identifier (ID) (user identity can be anonymized)
4. Login timestamp
5. Login IP address In some implementations, the above five fields are used in the group analysis process. The user IDs can be anonymized. However, the anonymization process is configured to preserve a 1-1 mapping between the real user ID and an anonymized user ID, so that the system can keep track of a user's activity. The real user IDs often provide information for detection as well, since malicious accounts often have strong naming patterns.

Other information or meta-data regarding a user event is not required, but can help increase the detection coverage and accuracy. The system can optionally obtain the following fields from user events:

1. User-agent of the event
2. For a transaction event, the transaction amount, and the associated payment or purchase information (e.g., Paypal account ID or purchased products). Credit card or bank account information is not needed.

Example Inputs are Illustrated in Table 1 Below:

TABLE 1

| Event ID | Event type | Event success | UserID | Timestamp | IP address |
| --- | --- | --- | --- | --- | --- |
| 1 | Login | 0 | HE12BN | Nov. 20, 2013 12:35:06 | 128.2.34.5 |
| 2 | Signup | 1 | AXV34K | Nov. 20, 2013 13:05:35 | 100.25.7.39 |
| 3 | Post | 1 | G8VB0M | Nov. 21, 2013 09:11:47 | 23.9.44.37 |

Outputs

After the analysis, the group analysis process can output groups of suspicious user accounts or groups of suspicious activity events along with a corresponding confidence measure.

Example Outputs:

| Group ID | Detected user/event ID | Confidence score |
| --- | --- | --- |
| 1 | G8VB0M | 0.9 |
| 1 | K3H9VN | 0.9 |
| 2 | J870LQ | 0.2 |
| 2 | RT0NGF | 0.2 |

Group Analysis

The first step in group analysis is to derive a set of features or statistics for each event or for user account. For an event, the features may be derived from the event attributes. Event attributes can include, for example, event timestamps, IP addresses, or user-agent strings. For a user account, the features and statistics may be derived using a user-stat process module, based on the user's historical events and the statistics of the user activities.

An example user-stat process 100 is shown in FIG. 1. For convenience the process 100 is described with respect to a system that performs the process. The system obtains a collection of user event logs or receives user events through real-time feeds (102). The system uses data from the user event logs/feeds to determine user properties (104). The system uses user properties to generate one or more groups (106). The system determines whether the generated groups are suspicious (108) and determines whether there are suspicious accounts or events using the suspicious groups (110).

User Stat Computation

Figure 2:
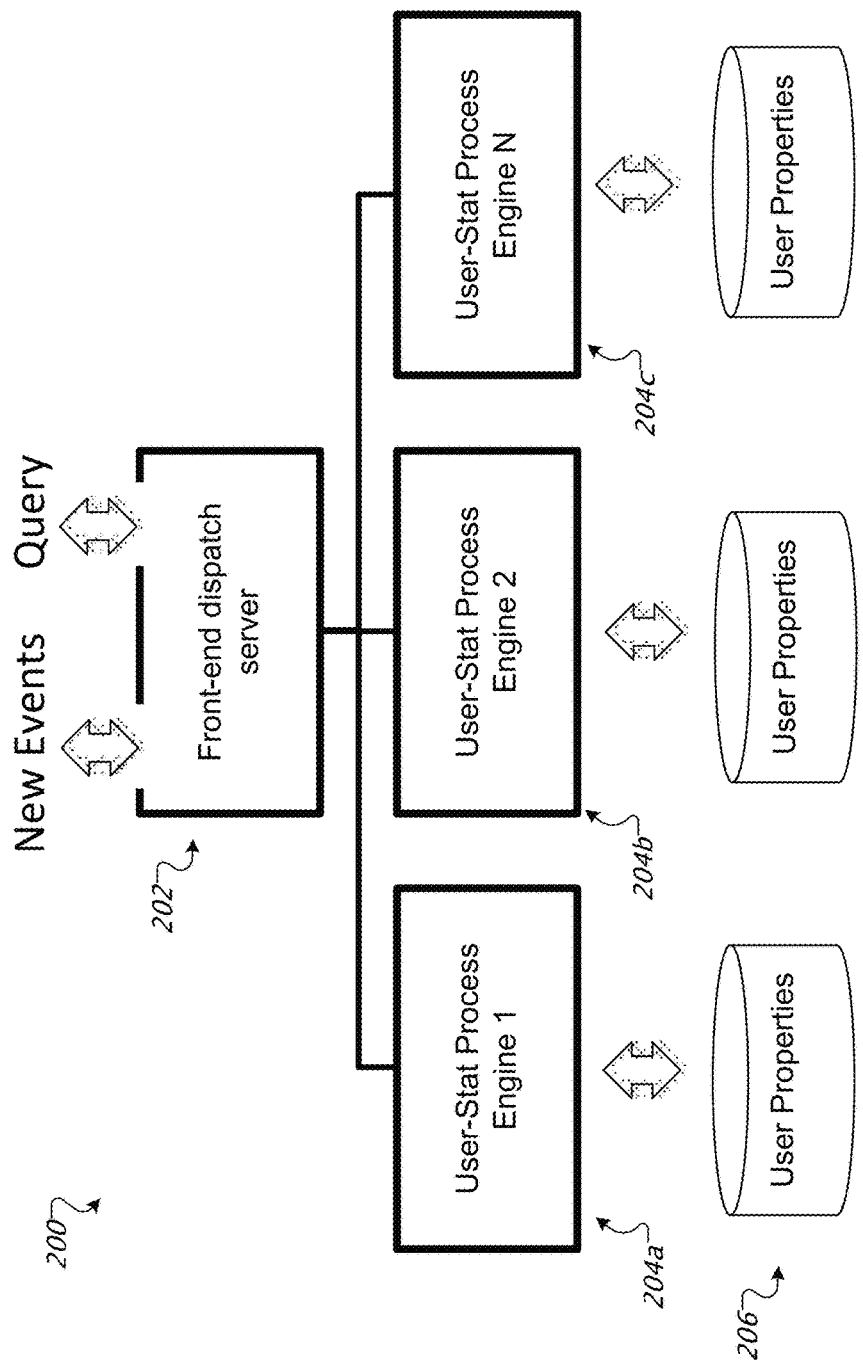
FIG. 2 illustrates a user-stat process in realtime mode.

The user-stat process may operate in a real-time mode or in a batch mode. FIG. 2 shows the process flow of the real-time mode analysis, where one or multiple user-process engines run in parallel to process different users. Specifically, in the real-time mode the user-stat process is active all the time. A front-end dispatch server 202 works with parallel user-stat process engines 204*a*, 204*b*, 204*c*. The front-end dispatch server 202 selects a particular user-stat process engine 204 to process received events.

In a small setup, a single user-stat processing engine can handle all traffic. More commonly, there are multiple user-stat process engines running in parallel, each processing user events.

The front-end dispatch server 202 takes in events (real-time user events or realtime queries) and dispatches them to one or more of the user-stat process engines 204. There can be multiple engines that are relevant to one event/query. Each user-stat process engine 204 outputs computed features and statistics for each user for storage in user properties 206. User features are described in greater detail below.

Each user-stat process engine periodically backups its state to persistent storage (e.g., one or more hard disks). When encountering a failure, the user-stat process engine can read its state from the persistent storage and resume.

Figure 3:
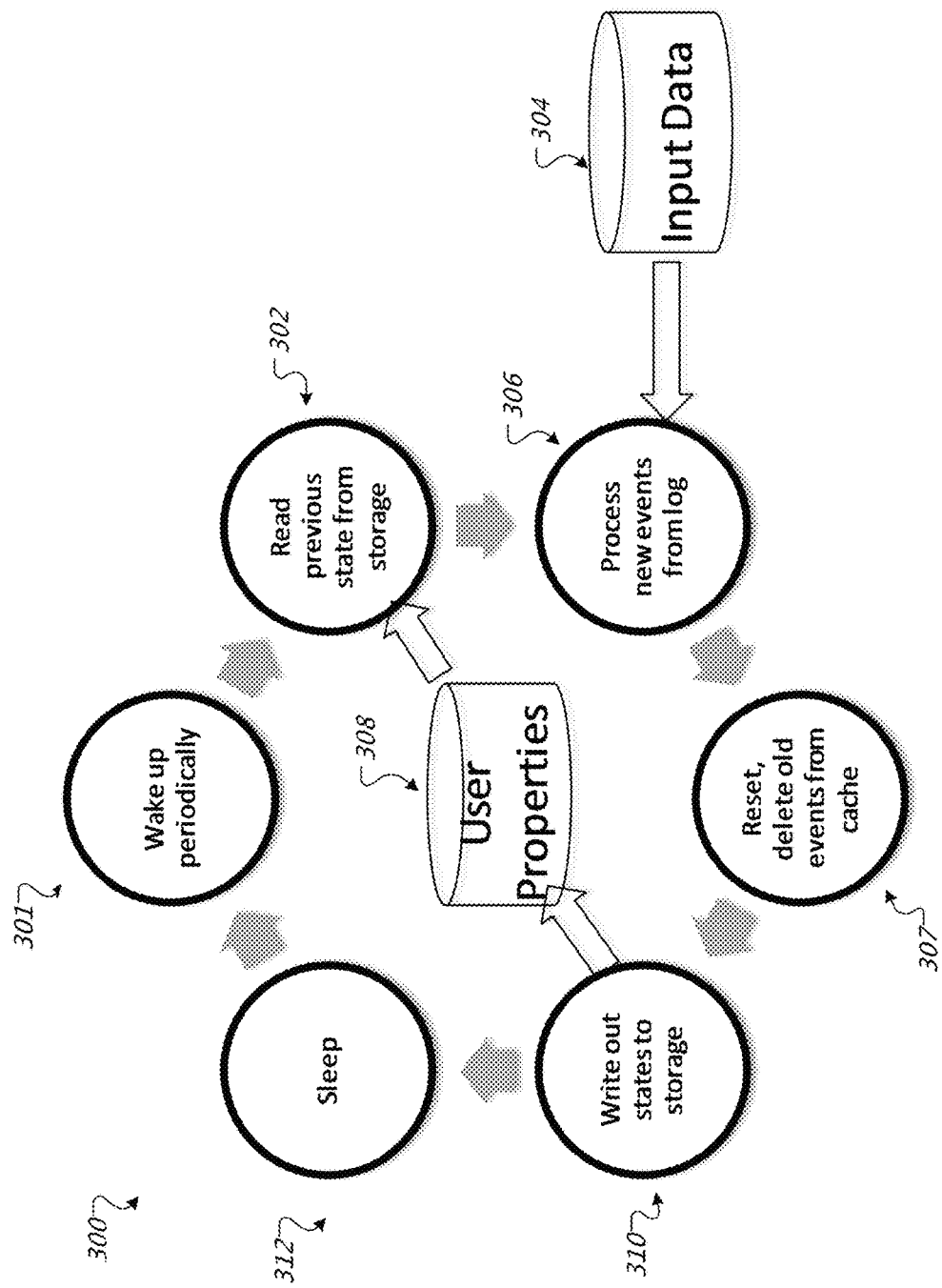
FIG. 3 illustrates the user-stat process in batch mode.
Like reference numbers and designations in the various drawings indicate like elements.

FIG. 3 shows an example batch mode process flow 300. In the batch mode, the system includes a frontend dispatch server and multiple user-stat processing engines, although the figure only shows the operation of one user-stat process engine for simplicity. In the batch mode, the user-stat process is only active periodically (301). The user-stat process periodically wakes up to process event logs and generates user features and statistics. After the user-stat process is woken up, it reads logs from storage including user properties of prior user states (302) and receives new data (e.g., new events) (304). New events are processed and user statistics are updated (306). A reset is performed deleting older events from a cache (307). The user state, which includes multiple user statistics and features, are written (310) to user properties (308). The process then returns to the sleep state 312.

During user-stat process, the system stores a set of computed features and statistics for each user. In addition, the system stores a set of recent events for each user in the cache. Recent events refer to the set of events that took place in the recent n days (batch detection window size), where n is a pre-determined parameter according to the storage size and data volume.

For the set of users that do not have very recent activities, the system keeps only their features and high-level statistics without maintaining the associated individual events.

The user features and statistics may be categorized into three types. The first type of user features statistics are lifetime features, which are computed based on the user's entire history (e.g., the total number of logins, the total number of posts, and/or the average interval between events). The second type of user features and statistics are recent features, which are computed using the user's recent events (e.g., recent number of logins, the velocity of recent posts). The first type of features and statistics can be cumulatively generated as the analysis engine observes more events from the user. The second type of user features and statistics can be computed based on a user's recent events and can be recomputed from scratch during each batch processing.

The third type of user features and statistics are computed based on the differences between the first type of features and the second types of features (e.g., the difference between lifetime velocity of posts vs. the recent velocity of posts, the difference between the total number of logins vs. the recent number of logins). Such differences are useful for detecting compromised user accounts. For example, if the second type of features computed from recent events are drastically different from the first type of features, then the user's recent events may appear abnormal from its history. The third type of features and statistics quantify such differences.

A feature can be represented as a single numerical number, a set of items (e.g., keywords or values), or a histogram of values. For features that can be represented as numerical numbers, the feature difference can be computed using the number difference. For features that are represented as a set of values (e.g., keyword set), the difference can be computed using 1-Jaccard index, where Jaccard index (or Jaccard similarity coefficient) is computed in terms of the number of overlapped values divided by the total number of items across the two sets (an example of using a Jaccard index can be found at http://en.wikipedia.org/wiki/Jaccard_index, which is incorporated by reference). For features that are represented as histograms, the difference can be computed using the KL divergence value (an example of the KL divergence value can be found at http://en.wikipedia.org/wiki/Kullback%E2%80%93Leibler_divergence, which is incorporated by reference), or the difference between the most dominant values in the two histograms, where the dominant value is the feature value that has the most number of occurrences in a histogram.

The combination of all features or statistics is referred to as a profile. For each user, the system can compute a corresponding profile. In addition, for each of one or more groups of users, the system can compute a corresponding group profile, e.g., by combing all the events and accounts together. Collectively across the entire user population or the entire event population, the system can also compute a global profile.

Group Creation

Attackers often control many accounts and conduct many malicious activities. When these accounts or the set of malicious events are put together as a group, they display much stronger signals in certain types of features than when they are examined individually. Therefore, the system clusters accounts or events into groups and analyze them collectively in a group setting. Within each group, if the set of accounts or events are correlated or have some similarity, the group is suspicious since attacker controlled accounts or events are often correlated or similar in some manner.

There are multiple techniques that can be used to construct a group, in particular, using the collected user features and statistics. For example, for users that log in from similar geo locations within a specified time frame, the system can group them into one group. As another example, for users that share similar actions, e.g., having similar keywords in the web posts, the system can group them into one group.

An individual user can belong to multiple different groups. For example, a user can log in from multiple geo locations, each corresponding to a different group. As another example, a user may use multiple keywords in different categories, and each category of keywords may correspond to a particular group.

To generate event groups, the system can group events based on the event attributes or combinations of event attributes. For example, the set of events that appeared from the same geo locations within a specified time frame can be grouped together. Alternatively, the set of events that originated from the same device according some form of device fingerprint (e.g., user-agent string) can be put together as a group.

Group Feature Derivation

Given a group associated with a set of users $\{U_1, U_2, \ldots, U_n\}$, the group profile building process considers each feature independently. For each feature j, the system builds a histogram $H_j$ based on all the feature value of $F_{ij}$, where $F_{ij}$ denotes the feature j of user i.

For count based features, building a histogram is straightforward. For example, let's consider a feature that captures the number logins per user. Among all users, the feature value varies from 1 to 100. Then the histogram has an x-axis from 1 to 100, the y-axis is the portion of users. If 10% of the users have 20 logins, the histogram has a value 0.1 for the index 20.

For keyword features, the system selects the popular keywords used by the users in the group. Similar to count, the system builds a keyword count histogram for a set of users. The x-axis is the keyword, y-axis is the percentage of users using that keyword.

For histogram features (e.g., keyword distribution), the system aggregates all histograms to create a new aggregated histogram. The x-axis contains all possible values of feature values (e.g., all keywords). The y-axis is the percentage of users using that feature value (e.g., keyword).

Among all features, the system could classify them into strong features (e.g., post keywords) and weak features (e.g., login counts, naming patterns). Strong and weak features can have different implications to attack detection. Strong features should refer to features that are hard to be circumvented by attackers, while attackers may play around with weak features to diversify them. An important step is to catch groups with suspicious strong features. However, some bad groups may not have strong bad features at early stages of the attack (e.g., registration or login time). Some good groups may also show suspicious patterns at strong features, but these features are atypical. These good groups are the false positive ones in detection and should be removed.

Suspicious Group Detection

To identify suspicious groups, the system also computes a global profile across the entire available user population or the entire event set. To do so, the system puts all the users (or all the events) together as a big group, and uses the similar method of computing group profiles to compute a global profile. The global profile captures the common behaviors of the overall population. It serves as the baseline of comparison to determine whether a specific group profile is suspicious.

To compare a group profile against the global profile (as baseline), the system compares the two profiles feature by feature. For each feature, the system computes whether the current feature histogram is suspicious when compared to the global feature histogram.

More specifically, in some implementations, the system examines each <key, value> pair of current feature histogram and compute the suspicious probability for this key. Then in some implementations, the system computes the minimum value of a probability among all input keys as the suspicious probability (alternatively, the system can use the average or 10% value instead of the minimum value). If this probability is low, it means such events are atypical and need further analysis.

One example of calculating a probability that a feature is suspicious is as follows: Suppose the probability of a feature value f (e.g., a particular user agent value, a keyword, or an occurrence counts) is p in the overall population. In the current group size of n, it occurs k times. In other words, the current group has a <f,k/n> in the histogram. The probability of such observation can be calculated using the Binomial distribution:

$$F(k; n, p) = Pr(X \le k) = \sum_{i=0}^{\lfloor k \rfloor} \binom{n}{i} p^i (1-p)^{n-i}$$

When the prior probability p>k/n, this means that this feature value is under represented in the group compared to the general population. In such case, the system skips this feature value because there must be another feature value that is higher than the general population.

When p is small (e.g., p<0.05) and when n is large enough (e.g., n>20 or n>100 and n×p<10), the system can use Poisson distribution to emulate the Binomial distribution:

$$f(k; \lambda) = Pr(X = k) = \frac{\lambda^k e^{-\lambda}}{k!},$$

where $\lambda=(n)\times(p)$.

Combining the above two equations, the overall probability of observation is:

$$\begin{cases} \sum_{i=0}^{k} \binom{n}{i} p^i (1-P)^{n-i}, \text{ when } p \text{ is not small or } n \text{ is not large} \\ \frac{\lambda^k e^{-\lambda}}{k!}, \text{ when } p \text{ is small and } n \text{ is large} \end{cases}$$

If the probability of observation is low, e.g., below a preset threshold t, then the corresponding feature looks suspicious for this group, and is tagged as a suspicious feature.

To determine whether a group is suspicious, in some implementations the system examines the number of features that are suspicious and combines the information of whether the tagged feature is a strong feature or not. For a strong feature, if it is suspicious, then the system can simply mark the group as a suspicious group. If no strong features are suspicious, then the system may require at least k weak features to all look suspicious to output this group as a suspicious group, where k is a preselected threshold.

Another way to detect whether a group is suspicious is through machine-learning methods when training data is available. Given the group analysis already produces a profile with a set of features. These features can be used to generate machine learning feature vectors or attributes. The suspicious scores for each feature can also be used. Therefore, the system can use the already detected bad groups to train a risk model or a classifier, and then apply the learned model and classifier to decide whether a new group is suspicious.

Malicious Account (or Event) Detection

Once the system detects a suspicious group, the system can determine malicious accounts or events associated with the suspicious group. In some implementations, the system outputs all users or events in the detected group as malicious accounts or events. In some other implementations, the system further examines whether each user in the group matches the group profile.

To determine whether a user matches a group profile, the system compares the user's profile against the group profile feature by feature.

For each feature, if it is classified as a suspicious feature for the group profile, then the system identifies the set of feature values that have the suspicious probability lower than the preset threshold t. If the user's feature value is among the set of suspicious feature values, the system considers it a match for this feature.

If a feature is not classified as suspicious, the system examines whether the user's feature value, or the dominant feature value, is the same as the feature value, or the dominant feature value, of the group profile. If so, the system considers a match for this feature too.

If a user profile matches all suspicious features of a group profile, and in addition, for the remaining un-suspicious features, the user profile matches at least m features (where m is a pre-set threshold), then the system considers this user's profile matches the suspicious group profile. The system classifies this user as a malicious account. This similar approach can be applied to the detection of malicious events if the group profile is computed using a set of events instead of a set of accounts.

Alternatively, in some other implementations, the system can use machine-learning-based approaches to identify suspicious users when training data is available. Rather than strictly requiring matching at least m features, the system can apply a learned model to the matching results and use that to determine whether the user is suspicious.

In some implementations, the system does not need a group profile to be tagged as a suspicious group for detection, in particular in the case where the system may have external information about one or a few known malicious accounts or events. For example, such information can be derived from manual review, or notified from customer report. In such case, with the knowledge of known bad accounts or events, the system can simply check if they fall into some group. If the known bad accounts or events fall into some groups, the system can examine whether the bad accounts or events share similar profiles with other account or event profiles in the same group. Here the profile comparison can be conducted in a similar manner as matching a profile against a group profile. The system can output all the additional accounts or events that share similar profiles as also malicious accounts and events. This approach enables the system to capture a large set of malicious accounts (or events), when the system has the knowledge of only one or a few of them before detection.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory program carrier for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The term "data processing apparatus" encompasses all kinds of apparatus, devices, and machines for processing data, including by way of example a programmable processor, a computer, or multiple processors or computers. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, or a combination of one or more of them.

A computer program (which may also be referred to or described as a program, software, a software application, a module, a software module, a script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Computers suitable for the execution of a computer program include, by way of example, can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:
1. A method comprising:
   obtaining a collection of events, each event being associated with a user account activity and including a set of event attributes;
   deriving a set of event features for each event using the event attributes;
   for each user account, obtaining a set of user features associated with historical events of the user account;
   creating one or more groups including event groups and user groups including using the user features to assign each user account to one or more user groups, wherein the user accounts associated with each user group share a measure of similarity for one or more features, wherein each group has a group profile derived from the respective user and event features of the group;
   for each group, generating a feature histogram for each feature of the group;
   determining, using one or more computing devices, whether one or more groups are suspicious groups based on a comparison of each group of the plurality of groups to a global profile associated with the plurality of users, wherein the global profile is a group in which all user accounts are a member to form a baseline, and wherein the comparison of each group profile to the global profile includes:
      performing a feature by feature comparison of feature histograms values computed for features of the group with a global feature histogram for each corresponding feature of the global profile, calculating a probability that a particular feature is suspicious for each of the features of the group based on the comparison of the feature histograms, and examining the features having a threshold probability of being suspicious and their respective feature strengths to determine whether the group is suspicious; and in response to a determination that one or more groups are suspicious, determining whether there are malicious accounts or events associated with each suspicious group.

2. The method of claim 1, wherein generating the plurality of groups of events comprises grouping events based on event attributes or combinations of event attributes.

3. The method of claim 1, comprising:
generating a group profile for each group, wherein each group is associated with a set of user accounts.

4. The method of claim 3, wherein features for each event or account associated with the user accounts of the group are used to generate the group profile for a group.

5. The method of claim 3, comprising generating the global profile across the available user population or event set.

6. The method of claim 1, wherein for each group determined to be suspicious, all user accounts or events in the detected group are output as malicious.

7. The method of claim 1, wherein for each group determined to be suspicious, it is determined whether each user account in the group matches a group profile according to an analysis of each feature.

8. The method of claim 7, wherein if it is determined that a user account in the group matches the group profile, then the user account is output as malicious.

9. The method of claim 1, wherein determining whether a group is suspicious includes determining whether each feature of the group is suspicious and whether or not each suspicious feature is a strong feature or a weak feature.

10. A system comprising:
one or more computers, each having one or more processors and one or more memories, configured to perform operations comprising:
obtaining a collection of events, each event being associated with a user account activity and including a set of event attributes;
deriving a set of event features for each event using the event attributes;
for each user account, obtaining a set of user features associated with historical events of the user account;
creating one or more groups including event groups and user groups including using the user features to assign each user account to one or more user groups, wherein the user accounts associated with each user group share a measure of similarity for one or more features, wherein each group has a group profile derived from the respective user and event features of the group;
for each group, generating a feature histogram for each feature of the group;
determining whether one or more groups are suspicious groups based on a comparison of each group of the plurality of groups to a global profile associated with the plurality of users, wherein the global profile is a group in which all user accounts are a member to form a baseline, and wherein the comparison of each group profile to the global profile includes:
performing a feature by feature comparison of feature histogram values computed for features of the group with a global feature histogram for each corresponding feature of the global profile,
calculating a probability that a particular feature is suspicious for each of the features of the group based on the comparison of the feature histograms, and
examining the features having a threshold probability of being suspicious and their respective feature strengths to determine whether the group is suspicious;
in response to a determination that one or more groups are suspicious, determining whether there are malicious accounts or events associated with each suspicious group.

11. The system of claim 10, wherein generating the plurality of groups of events comprises grouping events based on event attributes or combinations of event attributes.

12. The system of claim 10, further configured to perform operations comprising:
generating a group profile for each group, wherein each group is associated with a set of user accounts.

13. The system of claim 12, wherein features for each event or account associated with the user accounts of the group are used to generate the group profile for a group.

14. The system of claim 12, further configured to perform operations comprising generating a global profile across the available user population or event set.

15. The system of claim 14, wherein determining whether a group is a suspicious group includes comparing the group profile with the global profile.

16. The system of claim 10, wherein for each group determined to be suspicious, all user accounts or events in the detected group are output as malicious.

17. The system of claim 10, wherein for each group determined to be suspicious, it is determined whether each user account in the group matches a group profile according to an analysis of each feature.

18. The system of claim 17, wherein if it is determined that a user account in the group matches the group profile, then the user account is output as malicious.

19. The system of claim 10, wherein determining whether a group is suspicious includes determining whether each feature of the group is suspicious and whether or not each suspicious feature is a strong feature or a weak feature.

20. The method of claim 1, wherein comparing features of the group with features of the global profile includes comparing feature histogram of the group with a feature histogram of the global profile.

21. The method of claim 20, wherein a suspicious probability is calculated for each (key, value) pair of the group histogram.

22. The method of claim 1, further comprising using machine learning to determine whether a group is suspicious.

23. One or more non-transitory computer-readable storage media encoded with instructions that, when executed by one or more computers, cause the one or more computers to perform operations comprising:
obtaining a collection of events, each event being associated with a user account activity and including a set of event attributes;
deriving a set of event features for each event using the event attributes;
for each user account, obtaining a set of user features associated with historical events of the user account;
creating one or more groups including event groups and user groups including using the user features to assign each user account to one or more user groups, wherein the user accounts associated with each user group share a measure of similarity for one or more features, wherein each group has a group profile derived from the respective user and event features of the group;

for each group, generating a feature histogram for each feature of the group;

determining, using one or more computing devices, whether one or more groups are suspicious groups based on a comparison of each group of the plurality of groups to a global profile associated with the plurality of users, wherein the global profile is a group in which all user accounts are a member to form a baseline, and wherein the comparison of each group profile to the global profile includes:

performing a feature by feature comparison of feature histograms values computed for features of the group with a global feature histogram for each corresponding feature of the global profile, calculating a probability that a particular feature is suspicious for each of the features of the group based on the comparison of the feature histograms, and examining the features having a threshold probability of being suspicious and their respective feature strengths to determine whether the group is suspicious; and in response to a determination that one or more groups are suspicious, determining whether there are malicious accounts or events associated with each suspicious group.

* * * * *